United States Patent [19]

Wareham

[11] 4,145,133

[45] Mar. 20, 1979

[54] FILM ASSEMBLAGE OF THE SELF-DEVELOPING TYPE TOGETHER WITH APPARATUS FOR PROCESSING THEREOF

[75] Inventor: Richard R. Wareham, Marblehead, Mass.

[73] Assignee: Polaroid Corporation, Cambridge, Mass.

[21] Appl. No.: 818,410

[22] Filed: Jul. 25, 1977

[51] Int. Cl.² .................................... G03B 17/26
[52] U.S. Cl. ............................... 354/275; 96/78; 242/71.1; 354/83
[58] Field of Search ................ 354/83, 210, 275; 352/233; 242/71.1, 74; 96/76 C, 78, 201

[56] References Cited

U.S. PATENT DOCUMENTS

| | | | |
|---|---|---|---|
| 2,702,673 | 2/1955 | Steiner | 242/74 X |
| 2,731,894 | 1/1956 | Leitz et al. | 354/275 |
| 2,861,885 | 11/1958 | Land | 96/29 |
| 3,350,990 | 11/1967 | Finelli et al. | 354/86 |
| 3,364,027 | 1/1968 | Nerwin | 96/78 |
| 3,451,818 | 6/1969 | Wareham | 96/78 |
| 3,460,449 | 8/1969 | Eagle | 96/78 |
| 3,479,485 | 11/1969 | Hanna et al. | 219/243 |
| 3,676,123 | 7/1972 | Stephens | 96/76 C |
| 3,722,383 | 3/1973 | Van Allen et al. | 354/84 |

FOREIGN PATENT DOCUMENTS

| | | | |
|---|---|---|---|
| 659065 | 3/1963 | Canada | 354/275 |
| 1179988 | 2/1970 | United Kingdom | 354/275 |
| 1317655 | 5/1973 | United Kingdom | 354/275 |

Primary Examiner—John Gonzales
Attorney, Agent, or Firm—Edward S. Roman

[57] ABSTRACT

A photographic film assemblage of the self-developing type is specially configured for use in conventional cameras including those of the 35mm type. Photographic processing apparatus is provided for use in conjunction with the self-developing type film assemblages which have been previously exposed by the conventional type camera. The film assemblages comprise a substantially light-tight cartridge into which the film strip may be rewound subsequent to exposure in the conventional type camera thereby facilitating its removal from the camera and its insertion into the processing apparatus which operates again to withdraw the film strip from its cartridge so as to effect the processing of the film strip. After processing, the film strip is advanced from the processing apparatus to provide a plurality of fully developed transparencies which may be cut and framed in a conventional manner.

8 Claims, 8 Drawing Figures

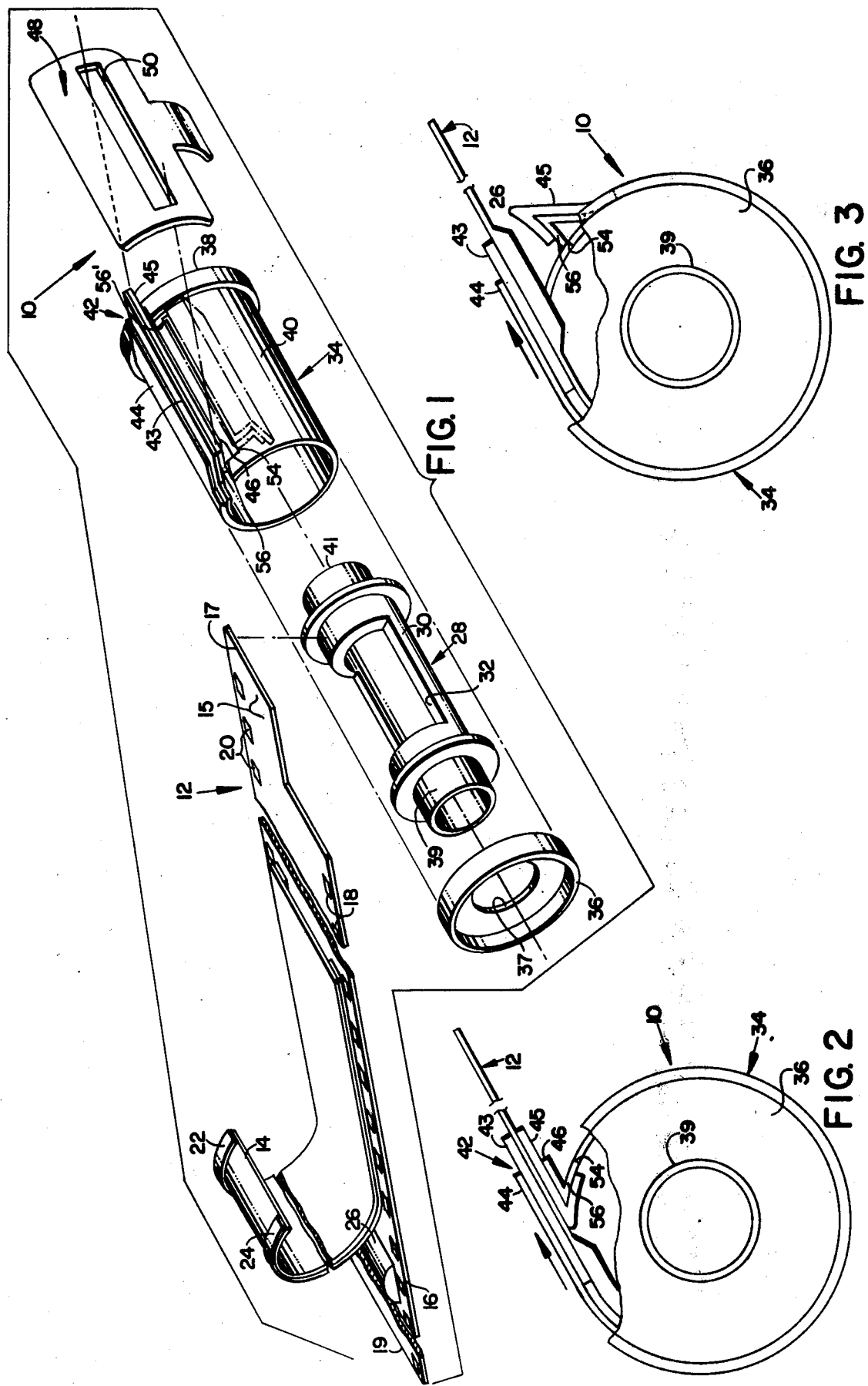

FILM ASSEMBLAGE OF THE SELF-DEVELOPING TYPE TOGETHER WITH APPARATUS FOR PROCESSING THEREOF

BACKGROUND OF THE INVENTION

1. Field of the Invention

This invention relates generally to a film assemblage of the self-developing type together with apparatus for processing thereof, and more particularly to a self-developing film assemblage for use in conventional cameras together with apparatus for processing the exposed film in order to provide immediate photographic prints of the transparency type.

2. Background of the Prior Art

Cameras for use with self-developing type film as well known in the art and generally include special apparatus for effecting the rapid processing of the self-developing type film. One such camera as described in U.S. Pat. No. 3,350,990 entitled "Camera Apparatus", by P. Finelli, issued Nov. 7, 1967, relates to a camera of a miniature or so called 35mm type embodying special structural elements which cooperate to effect the loading, exposure, processing and removal of the film pack used therewith. The aforementioned camera additionally includes special apparatus for producing a completely processed and mounted transparency quickly following each photographic exposure. The special processing apparatus associated with this camera includes, in brief, a magazine, a transport means for drawing each film unit between a pair of pressure rolls and depositing the compressed film unit in a lighttight chamber wherein it is processed. The pressure rolls are closed and opened in a programmed sequence and access to the chamber is provided for removal of processed prints. The self-developing type film units specially configured for use in this camera are not suitable for use in other conventional 35mm cameras.

Therefore, it is a primary object of this invention to provide a film assemblage of the self-developing type which may be used in conventional commercially available cameras including those of the 35mm type.

It is a further object of this invention to provide a photographic processing apparatus for processing self-developing type film units that have been previously exposed in a conventional commercially available type camera.

It is an even further object of this invention to provide a photographic processing apparatus for use with self-developing type film which has been previously exposed in a conventional type camera to provide a plurality of fully developed transparencies suitable for cutting and framing in a well known manner.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

A photographic system is provided for processing an elongated exposed film strip of the type comprising at least two superposed sheets of photographic material and at least one pod of photographic processing composition disposed adjacent the trailing end of the film strip wherein the film strip is helically wound for containment in a substantially lighttight cartridge from which it may be withdrawn, leading end first, in a given direction. The photographic processing system comprises an opaque housing to provide a substantially lighttight environment in which the exposed film unit may be withdrawn from its cartridge in a given direction without further exposure thereof. Means are provided within the housing for receiving and releasably holding the film cartridge to allow the withdrawal of the film strip from its cartridge without substantially moving the cartridge. Processing means are also included for first withdrawing the exposed film strip, leading end first, from its cartridge in the given direction and then winding the withdrawn film strip in a helical coil. The processing means operates to withdraw the entire length of the film strip including the pod of processing composition and is thereafter actuable subsequent to the withdrawing and winding of the film strip for advancing the exposed film strip, trailing end first, in a direction generally opposite to the given direction. The processing means additionally operates to apply pressure to the film strip wherein the pressure is of sufficient force to break the pod of processing composition to effect the spreading of the processing composition between the superposed sheets in correspondence with film advancement through the pressure applying means. Means are also provided for accommodating the exit of the exposed processed film strip, trailing end first, from the housing without effecting the substantially lighttight environment within the housing.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiment or when read in connection with the accompanying drawings wherein like numbers have been employed in the different figures to denote the same parts and wherein:

FIG. 1 is an exploded perspective view of the film assemblage of this invention;

FIG. 2 is a side elevational view with portions broken away of the film assemblage of FIG. 1 in a particular mode of its operation;

FIG. 3 is a side elevation view with portions broken away of the film assemblage of FIG. 1 in another mode of its operation;

DESCRIPTION OF THE PREFERRED EMBODIMENT

Referring now to FIG. 1 there is shown generally at 10 a film assemblage of this invention which is suitable for use with known commercially available cameras which may be of the 35mm type, a representative model of which is more fully described in U.S. Pat. No. 3,377,936 entitled "Easy Loading Apparatus For Film Supply For Photographic Cameras" issued Apr. 16, 1968. Such known cameras generally include means for operably locating a conventional single reel cartridge of film of the non-self-processing type which has a generally cylindrical housing structure of a given diameter and a given length with an elongated light sealed opening extending therethrough. A spool is mounted in the housing structure for rotation about an axis extending lengthwise of the housing structure and includes a central substantially uninterrupted axle portion around which an elongated strip of photographic film is coiled for storage intermediate the central axle portion of the spool and the inner surface of the cylindrical housing structure with a free end of the film strip extending through the opening. For further information regarding such well known film cartridges, reference may be made to U.S. Pat. No. 3,537,376 entitled "Light Lock For The Entrance/Exit Passageway of A Container For Light Sensitive Material" By P. Fleming et al. issued Nov. 3, 1970.

Figure 7:
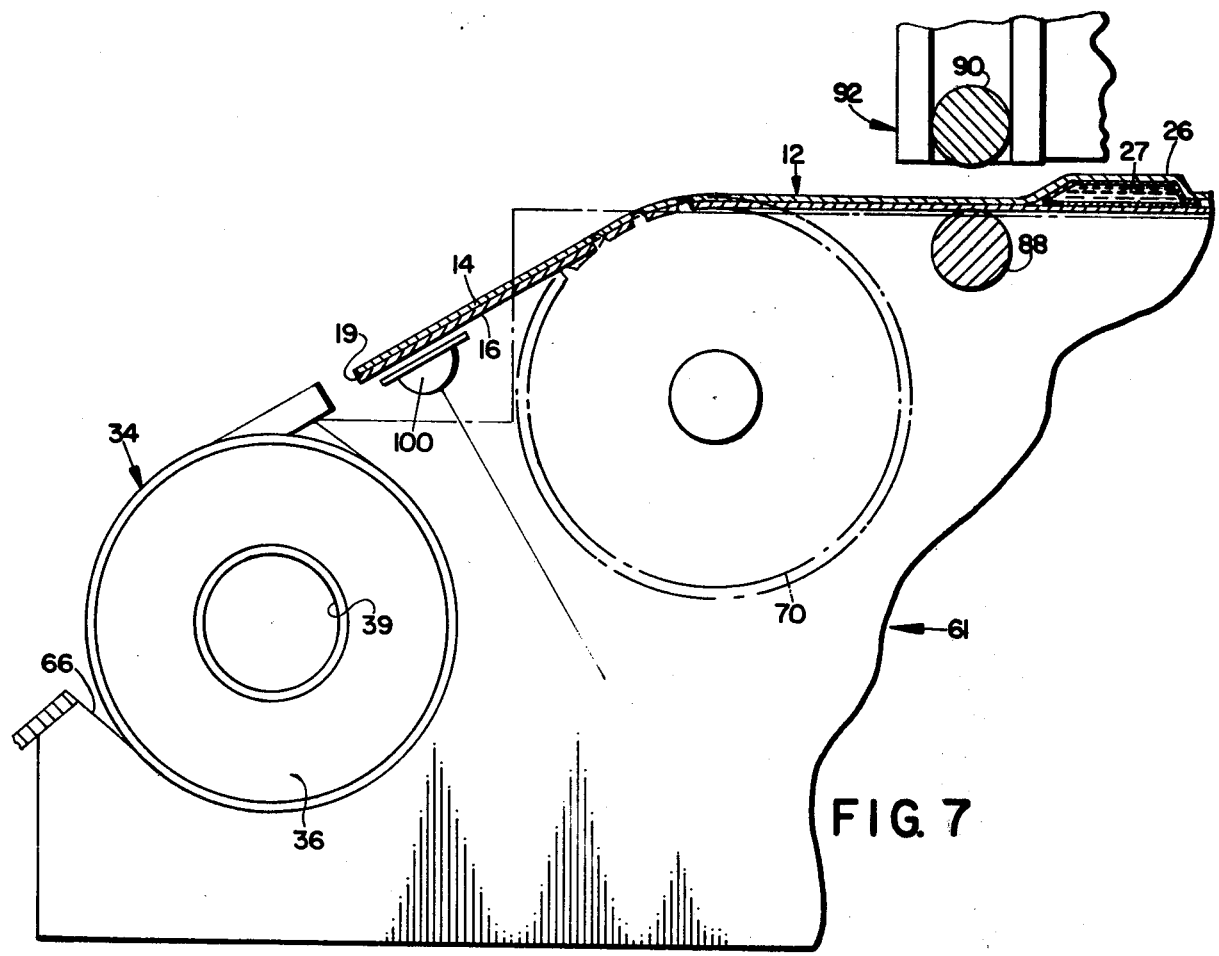
FIG. 7 shows an enlarged portion of FIG. 5 in another mode of its operation.

The film assemblage 10 of this invention includes an elongated film strip 12 comprising at least 2 superposed sheets 14, 16 of photographic film material having leading and trailing end portions, show respectively at 17 and 19, together with at least one pod 26 of photographic processing fluid or composition 27 (see FIG. 7) disposed adjacent the trailing end 19 of the film strip between the superposed sheets 14 and 16 of photographic film material.

The photographic sheet material 14 may comprise a silver halide strata to operate as a negative while the photographic film sheet 16 comprises a silver receptive strata to operate as a positive. The processing composition 27 within the pod 26 may contain for example, a silver halide developer such as hydroquinone, a silver halide solvent such as sodium thiosulfate, and a film forming material such as a water-soluble polymer, such as starch or gum. Either or both the silver halide stratum 14 together with the silver receptive strata 16 are preferably semi-transparent so that the image presented by the superposed negative and positive prints may be readily observed by transmitted light. The spreading of the processing composition 27 in a uniformly thin layer between the superposed sheets 14 and 16, for example by advancing the film strip 12 between a pair of pressure applying rollers in a manner to be more fully described, results in the formation of a negative print in the photographic sheet 14 by reducing silver halide to silver, and also be reacting with unreduced silver halide, results in the formation of complex silver salts which migrate to the film sheet 16 where they are reduced to silver to form a positive print. When the processing composition 27 is dry, there is formed a more or less solid residue which serves as an adhesive to bond the superposed sheets 14 and 16 of photographic film material together. Additional information regarding the aforementioned film strip 12 may be provided by referring to U.S. Pat. No. 2,861,885 entitled "Photographic Processes and Products" by E. Land, issued Nov. 25, 1958.

The film strip 12 may also comprise spaced apart strips of heat activable adhesive as shown generally at 22 and 24 disposed generally along the longitudinal edges of the film strip 12 between the superposed sheets 14 and 16 of photographic material. In addition, one of the sheets of photographic material, as is shown at 16, may also include rows of spaced apart preforations as shown generally at 18 and 20, which rows are disposed along the longitudinal edges of the film strip 12 in a conventional manner to facilitate the movement of the film strip in a manner as is well known in the art.

The film assemblage 10 additionally includes a spool as shown generally at 28, about which the film strip 12 is helically wound. The spool 28 comprises a center axial portion 30 which is adapted to releasably connect to the trailing end 19 of the film strip 12 in a well known manner to accommodate the winding of the film strip 12, trailing end 19 first, about the center axial portion 30. The center axial portion 30 includes a recess 32 formed therein of a given depth and a given width which is preferably less than the width of the film strip 12. The recess 32 is provided to receive and store the pod 26 of photographic processing composition substantially within the limits defined by the outer periphery of the center axial portion 30. Thus the pod 26 of the processing composition is dimensioned to be seated in the recess 32 so that substantially the same length of film strip 12 can be stored around the center axial portion 30 within the film assemblage 10 as could otherwise be stored were the pod 26 to be removed from the film strip 12. The spool 28 additionally includes journal portions 39 and 41 extending outward from the opposed ends thereof to facilitate the rotatable mounting of the spool 28 in a manner to be subsequently described.

The film assemblage additionally includes an opaque generally cylindrical cartridge or housing 34 of substantially the same given length and diameter as the aforementioned conventional film cartridge (see U.S. Pat. No. 3,537,376, supra). Cartridge 34 comprises cylindrical endwall portions 36 and 38 interconnected by a cylindrical sidewall portion 40 to define a substantially lighttight chamber therein. The end wall portions 36, 38 may be connected in any conventional manner to the sidewall portion 40 such as by press fitting. The endwalls 36 and 38 include respective bearing surfaces, one of which is shown at 37, for rotatably supporting respective journals 39 and 41 from the spool 28 thereby mounting the spool 28 for rotation about an axis extending lengthwise of the cartridge 34. The cartridge 34 is provided with a substantially lighttight or light sealed opening as shown generally at 42 extending lengthwise thereof through which the leading edge 17 of the film strip 12 extends in order to facilitate its withdrawal from the cartridge. The lighttight opening 42 is defined by two tangentially extending lip portions 44 and 46, each of which is respectively faced with a foam-cloth laminate 43, 45 to provide an effective light lock as is more fully described in U.S. Pat. No. 3,537,376, supra. The lighttight opening 42 is preferably of sufficiently narrow width to inhibit the withdrawal of the pod 26 of processing composition from the cartridge 34. A projection 15 is also provided adjacent the leading edge 17 of the film strip 12 to prevent the leading edge 17 from being rewound into the cartridge 34 for reasons which will become apparent from the following discussion.

Means are cooperatively associated with the lighttight opening 42 in the form of a pull tab 48 which may be manually actuated to allow an increase in the width of the opening 42 to allow the withdrawal of the pod 26 of processing composition from the cartridge 34. The pull tab 48 includes an elongated opening 50 therethrough for receiving the lip portions 44 and 46 in generally tight frictional engagement therewith. Thus, the pull tab 48 may be releasably connected in overlying relation with respect to the sidewall 40 with the pull tab opening 50 in registration with the lighttight opening 42.

The sidewall portion 40 additionally includes two spaced apart parallel cuts or slits 56, 56' which extend from the lip portion 46 of the lighttight opening 42 along the side wall 40 to a fold line 54 which extends substantially along the length of the side wall portion 40 to interconnect the opposed cuts.

As is now readily apparent, the slits 56 are spaced apart by a distance at least as long as the lighttight opening 42 so as to lie substantially adjacent respective end wall portions 36, 38. Thus, removal of the pull tab 48 operates in cooperation with the fold line 54 to permit a portion of the side wall 40 to be folded outwardly as shown in FIG. 3 thereby allowing pod 26 of processing composition to be entirely withdrawn from the cartridge 34. Prior to its removal, the pull tab 48 operates to preclude the passage of the pod 26 of processing composition from the cartridge 34 without precluding the withdrawal of the forward portion of the film strip 20 by reinforcing the edges of the lighttight opening 42 and particularly that portion of the side wall 40 between the slits 56 from being bent outwardly about the fold line 54 in the manner as shown in FIG. 3. Thus, removal of the pull tab 48 permits the pod 26 of processing composition to be pulled against that portion of the side wall 40 intermediate the slits 56 so as to bend that portion of the side wall outwardly about the fold line 54 thereby effecting an increase in the width of the opening in the cartridge 34 through which the pod 26 of processing composition can be withdrawn.

The slits 56, 56' thereby provide sufficient depth to the lighttight opening 42 to permit the film strip 12 including the pod 26 of processing composition to be withdrawn therethrough without effecting the rupture of the pod 26.

Figure 4:
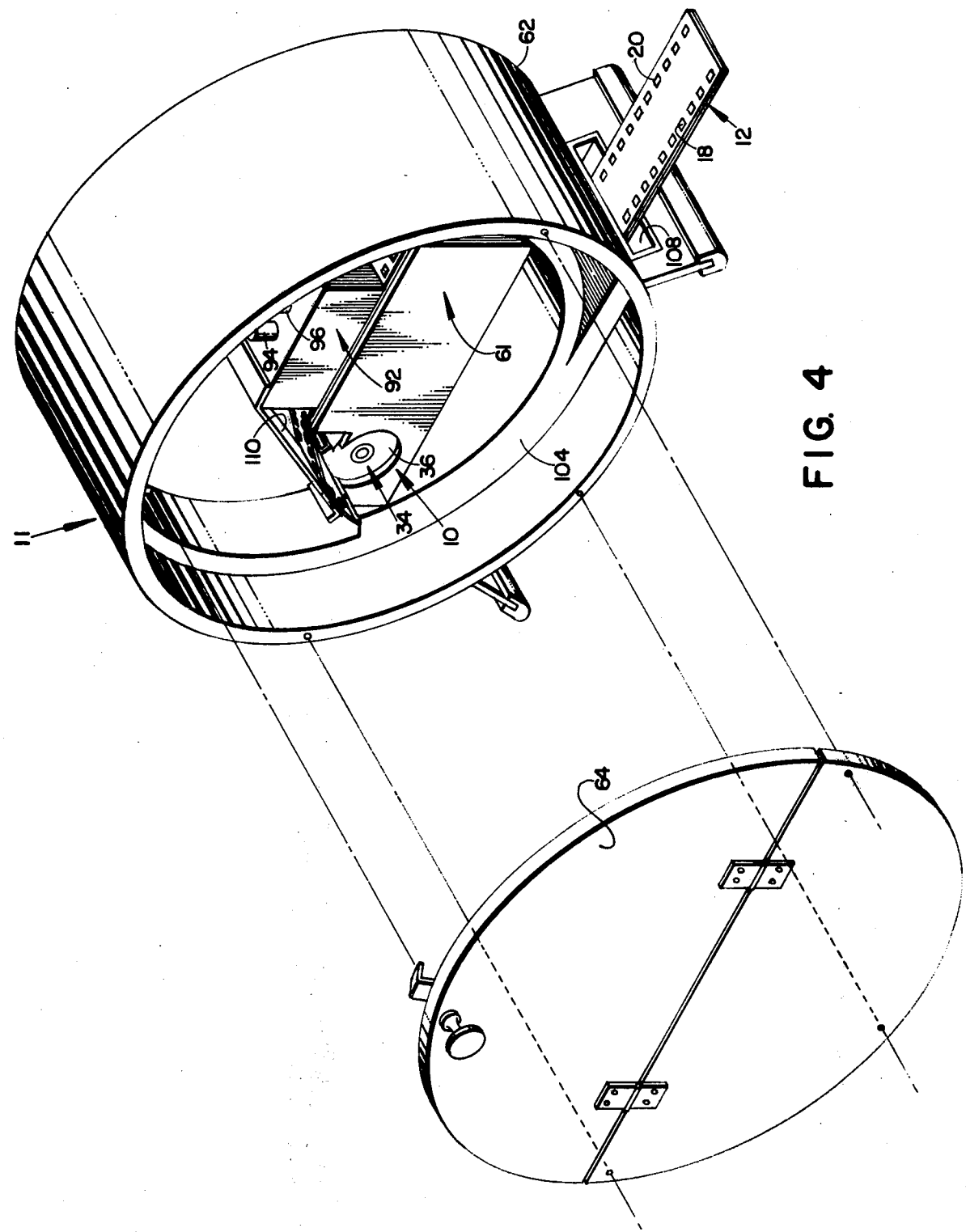
FIG. 4 is an exploded perspective view of the film processing apparatus of this invention.
Figure 5:
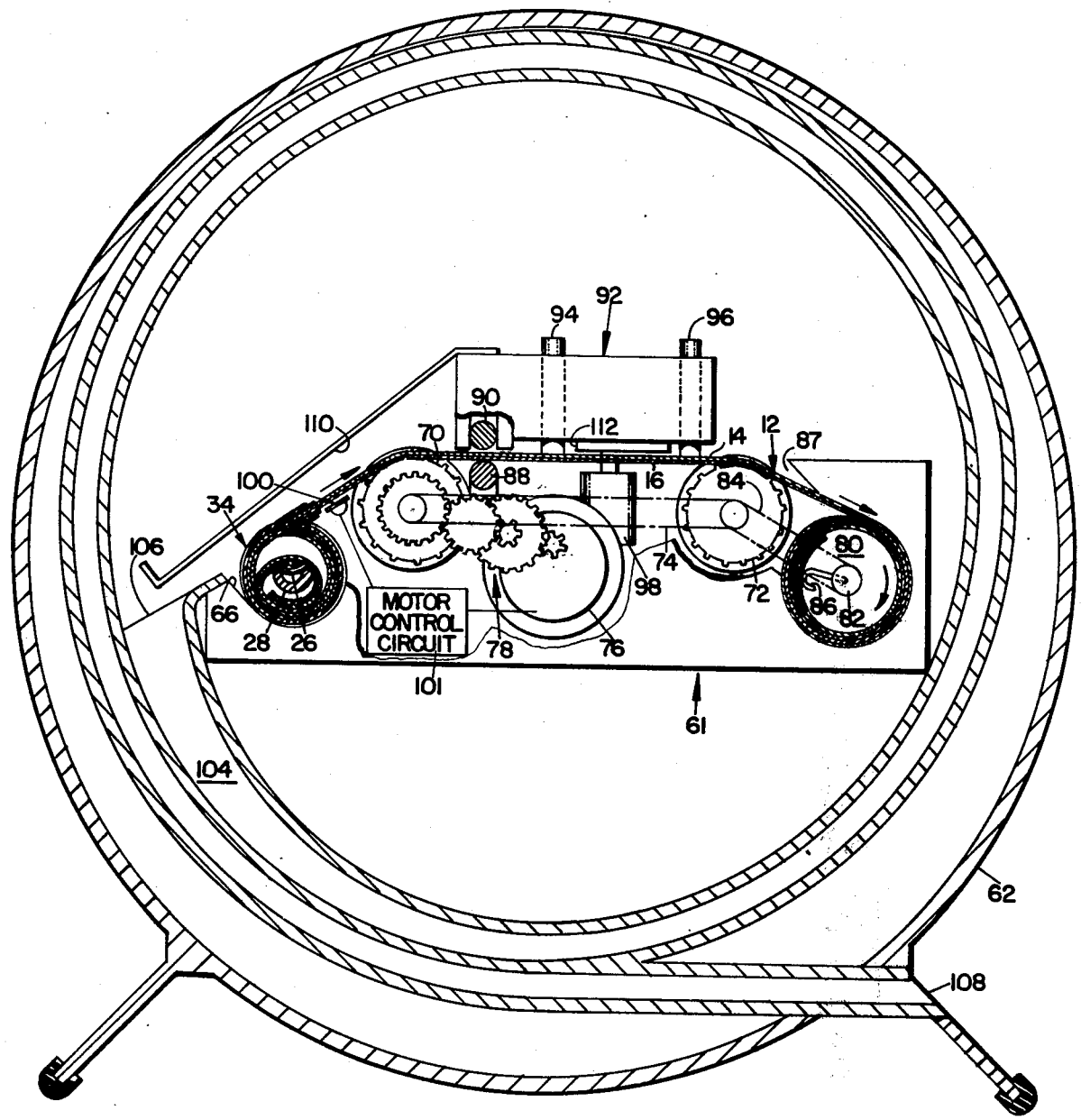
FIG. 5 is a cross-sectional view of FIG. 4 in a particular mode of its operation.
Figure 6:
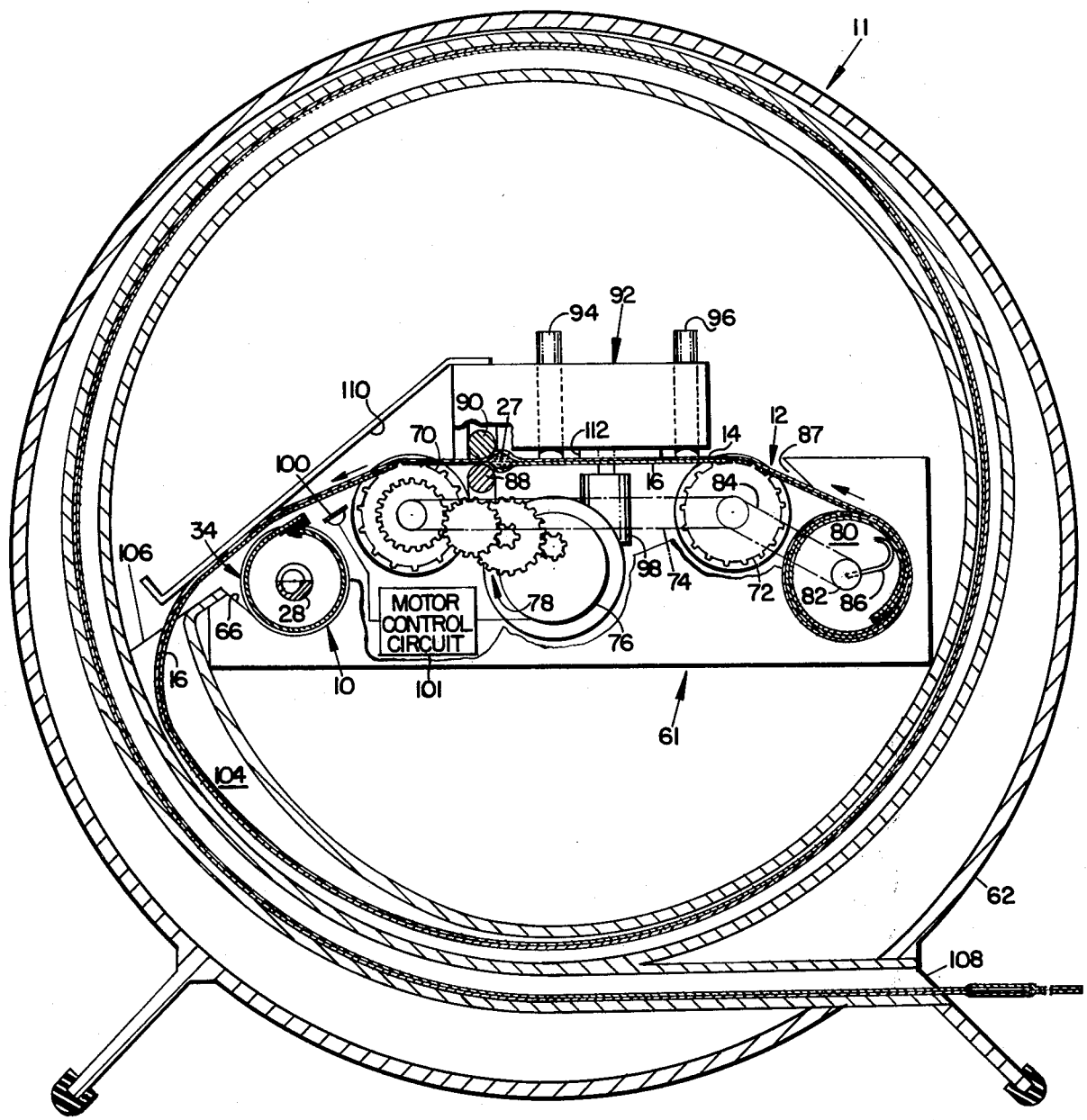
FIG. 6 is a cross-sectional view of the processing apparatus of FIG. 1 in another mode of its operation.

Referring now to FIGS. 4 through 6, there is shown a photographic processing apparatus at 11 having an opaque cylindrical housing 62 through which access may be provided by means of a hinged access door 64. When the access door 64 is closed, the housing 62 provides a substantially lighttight environment in which an exposed film strip 12 may be withdrawn from its cartridge 34 in a given direction without risk of further exposure to the film strip. Centrally disposed within the housing 62 there is provided a base block 61 which is selectively machined to define a film cartridge chamber 66 for receiving and releasably holding or locating an exposed film assemblage 10 to allow the withdrawal of the exposed film strip 12 from its canister 34 without substantially moving the canister 34.

Photographic processing means, which when connected to the leading end 17 of the film strip 12, operate to progressively withdraw the exposed film strip 12, leading end 17 first, from its canister 34 in a given direction and then wind the withdrawn film strip 12 in a helical coil. The film strip 12 may be withdrawn from its canister 34 by means of two spaced apart sprocket wheels 70, 72 which are rotatably disposed with respect to the base block 61. The sprocket wheels 70 and 72 may be rotatably driven in concert with each other by means of a chain or belt 74 which drivably connects the two sprocket wheels 70 and 72. The sprocket wheel 70 may be rotatably driven by way of a motor 76 and an interconnecting gear train 78.

Figure 8:
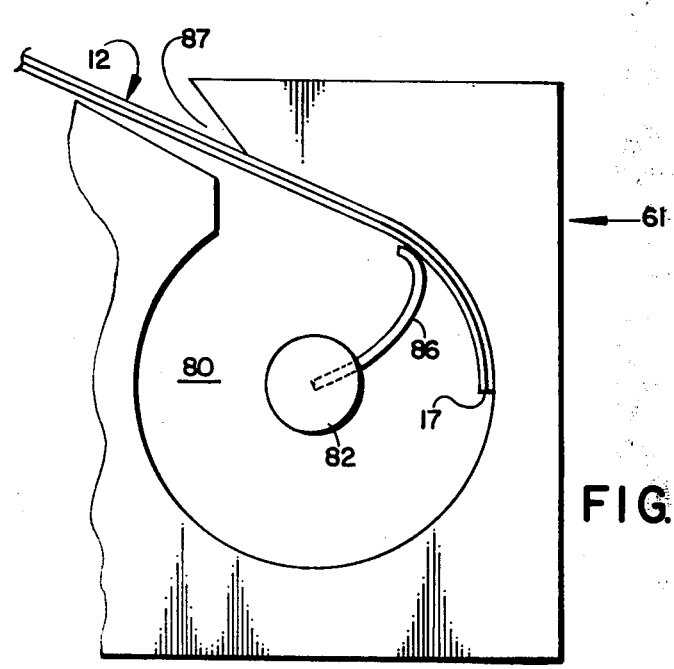
FIG. 8 shows an enlarged portion of FIG. 5 in still another mode of its operation.

Means comprising a generally cylindrical film receiving chamber 80 are provided for facilitating the automatic progressive winding of the withdrawn film strip 12 in helical coil so as to temporarily store the film strip 12. A rotatable member 82 is disposed for rotation along the center axis of the chamber 80 and includes a flexible wiper member 86 extending radially outward therefrom along the longitudinal length thereof. The rotatable member 82 and its associated wiper member 86 are rotatably driven in concert with the sprocket wheels 70, 72 by means of an interconnecting belt drive as shown generally at 84. The leading end 17 of the film strip 12 is guided into film receiving chamber 80 by way of a tappered inlet opening 87 as best viewed in FIG. 8.

A pair of opposed pressure applying rollers 88, 90 are provided to define a roller bite therebetween for processing the film strip 12 in a manner to be made more apparent from the subsequent discussion. As is readily apparent, roller 88 is rotatably connected with respect to the base block 61 whereas roller 90 is connected for rotation with respect to a movable frame member as shown generally at 92. Frame member 92 is disposed for vertical translation away from the base block 61 along two spaced apart stanchions 94, 96 which extend outward from fixed connection with respect to the base block 61. Translation of the frame member 92 along the stanchions 94, 96 may be controlled by way of a solenoid 98 in a manner to be subsequently described. The processing means additionally includes a photodiode 100 for sensing the complete withdrawal of the film strip 12 from its canister 34 for reasons which will also become apparent from the following discussion. The photodiode 100 in turn signals a control circuit 101 which controls the actuation of solenoid 98 and the direction of rotation of the motor 76 in a manner to be subsequently described.

Means are provided for accommodating the exit of an exposed processed film strip 12 from the housing 62 without effecting the substantially lighttight environment within the housing. Such means may comprise a helical elongated imbibition chamber 104 having an inlet opening 106 for receipt of the film strip 12 and an outlet opening 108 through which the developed film strip 12 may exit from the housing 62. The exposed and processed film strip 12 may be deflected into the inlet opening 106 by means of a film deflecting plate 110 which extends laterally outward from the frame member 92.

As previously discussed, the film assemblage 10 may be exposed in a conventional manner in any well known camera. During exposure of the film strip 12, the pull tab 48 remains connected to the canister 34 so as to inhibit the withdrawal of the entire film strip 12 including the pod 26 of processing composition. After the last frame of the film strip 12 is exposed, it may be rewound in the camera in a well known manner thereby permitting the removal of the film assemblage 10 from the camera without risk of further exposing the film strip 12. As is now readily apparent, the projection 15 prohibits the leading edge 17 of the film strip 12 from being rewound into the cartridge 34, thereby permitting its subsequent withdrawal in a manner to be herein described. After removing the film assemblage 10 from the camera, the user may then grasp the pull tab 48 so as to forceably remove it from the canister 34. Such removal need not be particularly difficult since the pull tab 48 may only be retained to the cartridge 34 by way of the frictional engagement between the tangentially extending lip portions 44 and 46 and the pull tab opening 50. Alternatively, a frangible adhesive could be utilized to connect the pull tab 48 to the cartridge 34 during exposure.

After exposing the film strip 12 and removing the pull tab 48 from the cartridge 34, the user may then insert the film assemblage 10 into the photographic processing apparatus 11 by way of the access door 64. The exposed film assemblage 10 may then be placed into the film receiving chamber 66 as shown in FIG. 4. The leading end 17 of the film strip 12 which was not rewound into the cartridge 34 may then be withdrawn in the given direction away from the cartridge 34 so as to at least overlie the sprocket wheels 70 and 72 with the rows 18 and 20 of spaced apart perforations engaged by the sprockets from respective sprocket wheels 70 and 72. As is readily apparent, the frame member 92 is actuated by the solenoid 98 to translate outwardly from the base block 61 thereby separating the distance between the rollers 88, 90 so as to define a gap therebetween in order that the rollers 88, 90 become ineffective in applying pressure to the exposed film strip 12 as the film strip 12 is withdrawn from its cartridge 34. Closure of the access door 64 may operate by way of the control circuit 101 to actuate the motor 76 which in turn drives the sprocket wheels 70, 72 by way of interconnecting gear train 78 and drive chain 74. In this manner, the exposed film strip 12 may be entirely withdrawn from its canister 34.

As the exposed film strip 12 is withdrawn in the given direction from its cartridge 34, the leading end 17 enters the film receiving chamber 80 by way of the inlet opening 87 and is thereafter grasped between the outside edge of the wiper member 86 and the inside surface of the film receiving chamber 80 (see FIG. 8) so as to continue the forward movement of the leading end 17 of the film strip around the cylindrical chamber 80 in a manner as is more fully taught in U.S. Pat. No. 3,377,936 entitled "Easy Loading Apparatus For Film Supply For Photographic Cameras", issued Apr. 16, 1968. As the winding of the exposed film strip 12 increases in the number of its turns within the chamber 80, the flexible wiper member 86 automatically reduces itself in outer diameter. The pod 26 of processing composition is ultimately withdrawn through the opening 42 by bending over that portion of the side wall 40 between the slits 56 and about the fold line 54 as previously described. The photodiode 100 thereafter senses the trailing end 19 of the exposed film strip 12 (see FIG. 7) so as to signal the motor 76 by way of the control circuit 101 to reverse its direction of rotation while simultaneously actuating the solenoid 98 to cause the frame member 92 to move toward the base block 61 thereby moving the pressure applying rollers 88, 90 into juxtaposed position with each other to establish a roller bite therebetween. Frame member 92 may additionally support a heater element 112 which is complementary to the spaced apart strips 22, 24 of the heat activatable adhesive so as to effectively activate the adhesive strips 22, 24 when the frame member 92 is moved to its position closely adjacent the base block 61 as shown in FIG. 6. The heater element 112 may also be activated by way of the control circuit 101.

Reversing the rotational direction of the motor 76, as is readily apparent, reverses the rotational direction of the sprocket wheels 70, 72 so as to advance the film strip 12, trailing end 19 first, in a direction generally opposite to the given direction in which the exposed film strip 12 was previously withdrawn from the cartridge 34. Advancement of the exposed film strip 12 past the heater element 112 operates to activate the spaced apart strips 22 and 24 of adhesive so as to bond the longitudinal edges of the two superposed sheets 14, 16 of photographic material together immediately prior to the application of pressure to the film strip 12 by way of the rollers 88, 90. The rollers 88, 90 thereafter exert a compressive force against progressive incremental sections of the film strip 12 containing the recorded images as it is advanced from the chamber 80 by the sprocket wheels 70, 72 to facilitate the rupturing of the pod 26 of processing composition and the spreading of the processing composition 27 between the superposed sheets 14, 16 in correspondence with film advancement through the pressure applying rollers 88, 90. The trailing edge 19 of the exposed and processed film unit 12 is thereafter advanced by way of the deflecting plate 110 into the inlet opening 106 of the imbibition chamber 104 from which it ultimately exits from the housing 62 by way of the outlet opening 108 after a sufficient duration has elapsed to allow the exposed and processed film strip 12 to develop a viewable image in the aforementioned manner. The viewable images provided by the exposed, processed and developed film strip 12 may be viewed by transmitted light and thus are categorized as transparencies. Such transparencies may thereafter be cut from the film strip 12 and mounted in frames suitable for insertion in a slide projector as is well known in the art. In this manner the photographer may process his own slide transparencies at home in an economical and efficient manner so that they may be viewed immediately after the last frame of the film strip 12 is exposed.

Since certain changes may be made in the above described embodiment without departing from the scope of the invention herein involved, it is intended that all matter contained in the above description or shown in the accompanying drawings be interpreted as illustrative and not in a limiting sense.

What is claimed is:

1. Apparatus for use with commercially available still picture cameras having means for operably locating a single reel cartridge of film of the non-self-processing type which is adapted to have sequentially recorded thereon a plurality of discrete subject images when utilized in such cameras and which has a generally cylindrical housing structure of a given diameter and a given length with an elongated light sealed opening extending therethrough, a spool mounted in the housing structure for rotation about an axis extending lengthwise of the housing structure and including a central substantially uninterrupted axle portion around which an elongated strip of such photographic film is coiled for storage intermediate the central axle portion of the spool and the inner surface of the cylindrical housing structure with a free end of the film strip extending through the opening, said apparatus comprising:

a generally cylindrical housing structure of substantially said given diameter and given length and having an elongated light sealed opening extending lengthwise thereof;

a spool mounted in said housing structure for rotation about an axis extending lengthwise of said housing structure, said spool including a central axle portion having a recess formed therein of given depth and width;

an elongated strip of unprocessed photosensitive self-developing film having a sufficient length to accommodate the sequential recording thereon of a plurality of discrete subject images, a width greater than the length of said spool recess and a first end connected to said spool, said self-processing film strip being coiled around said spool's central axle portion with its other end extending through said housing structure's opening, said self-processing film strip including a pod of processing fluid sufficient to process the entire photosensitive surface of said self-processing film strip, said pod being located adjacent said first end of said self-processing film strip and dimensioned to be seated in said recess of said spool's central axle portion so that substantially the same length of said self-processing film strip can be stored around said central axle portion within said cylindrical housing structure as could be so stored in said apparatus with said pod of processing fluid removed therefrom and whereby the same camera may be employed to effect the exposure of said self-processing film strip as well as the type of film heretofore utilized therein; and means for precluding said other end of said self-processing film strip from being drawn inside of said housing structure whereby said self-processing film strip may be withdrawn from said housing structure for sequential exposure in the camera and thereafter rewound back inside of said housing structure to facilitate its removal from the camera with said other end of said film strip being available to enable subsequent processing of said film strip outside of the camera.

2. The apparatus of claim 1 wherein said elongated light sealed opening is of sufficient depth to permit said self-processing film strip including the portion thereof containing said pod of processing fluid to be withdrawn therethrough without effecting the rupture of said pod and additionally including means overlying said cylindrical housing structure along the length of said light sealed opening for selectively precluding the passage of said pod containing portion of said self-developing film strip through said opening without precluding the withdrawal therethrough of portions of said self-developing film strip intermediate its said pod containing portions and its said other end.

3. A photographic film assembly comprising:

an elongated film strip having a sufficient length to accommodate the sequential recording thereon of a plurality of discrete still subject images and comprising at least two superposed sheets of photographic film material having leading and trailing end portions together with at least one pod of photographic processing composition disposed adjacent the trailing end of the film strip between said superposed sheets of photographic film material;

a spool about which said film strip is helically wound trailing end first, said spool having an elongated center axle portion structured and configured to releasably connect to the trailing end of the film strip to enable the film strip to be helically wound thereabout, said axle portion additionally including a recessed portion thereof for receiving and storing said pod of processing composition substantially within the limits defined by the outer periphery of said axle portion;

an opaque cartridge including opposed end wall portions structured to rotatably mount said spool therebetween and additionally including sidewall portions interconnecting said endwall portions to define a substantially lighttight chamber therein, said sidewall portions including a substantially lighttight opening through which said film strip extends from said cartridge, leading end first, said lighttight opening being of sufficiently narrow width to inhibit the withdrawal of said pod of processing composition from said cartridge, there additionally being included manually actuable means overlying said sidewalls and cooperatively associated with said lighttight opening for allowing an increase in the width of said opening to allow the withdrawal of said pod of processing composition from said cartridge; and means for precluding said leading end of said film strip from being drawn inside of said cartridge whereby said self-processing film strip may be withdrawn from said cartridge for sequential exposure and thereafter rewound back inside of said cartridge with said leading end of said film strip being available outside of said cartridge to enable subsequent processing of said film strip.

4. The film assembly of claim 3 wherein said elongated film strip is of the 35mm type.

5. The film assembly of claim 3 wherein said superposed sheets of film material comprise respectively, a negative and a positive.

6. The film assembly of claim 3 wherein said film strip comprises spaced apart strips of actuatable adhesive disposed along the longitudinal edges thereof between said superposed sheets of photographic material.

7. The film assembly of claim 6 wherein said adhesive is of the heat actuatable type.

8. The film assembly of claim 3 wherein said width increasing means comprises a pull tab releasably connected to said cartridge in overlying relation with respect to said side wall and lighttight opening, said pull tab having an opening therethrough of sufficiently narrow width to inhibit the withdrawal of said pod of processing composition through said lighttight opening when said pull tap opening is in substantial registration with respect to said lighttight opening thereby reinforcing the edges of said lighttight opening and inhibiting the deformation of the edges of said lighttight opening against the strain imposed by said pod in the course of withdrawing said film strip from said cartridge, said sidewall being structured to effect an increase in the width of said lighttight opening subsequent to the removal of said pull tab thereby permitting the withdrawal of said pod from said cartridge.

* * * * *